United States Patent
Heimpel et al.

(12)

(10) Patent No.: US 6,414,045 B1
(45) Date of Patent: Jul. 2, 2002

(54) ONE-COMPONENT POLYURETHANE COMPOSITIONS WITH IMPROVED CURING

(75) Inventors: Franz Heimpel, Affing; Silvia Huber, Neusäss; Peter Vogel, Untermeitingen, all of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/590,730

(22) Filed: Jun. 8, 2000

(30) Foreign Application Priority Data

Jun. 9, 1999 (DE) .......................................... 199 26 312

(51) Int. Cl.$^7$ ............................................... C08G 18/18
(52) U.S. Cl. .................... 521/130; 521/133; 521/138; 521/155; 521/159; 521/174
(58) Field of Search ................................ 521/155, 174, 521/159, 138, 130, 133

(56) References Cited

FOREIGN PATENT DOCUMENTS

| DE | 3835832 | 4/1990 |
|---|---|---|
| EP | 0345678 | 12/1989 |
| EP | 0292762 | 11/1998 |

*Primary Examiner*—John M. Cooney, Jr.
(74) *Attorney, Agent, or Firm*—Sidley Austin Brown & Wood, LLP

(57) ABSTRACT

A one-component polyurethane foam composition is described, which contains at least one prepolymer (isocyanate prepolymer), which has isocyanate groups, at least one blowing agent and known auxiliary and additive materials containing at least one ester, free of reactive hydrogens, of a polycarboxylic $C_2$ to $C_7$ acid and a monohydric $C_1$ to $C_7$ alcohol and/or a monocarboxylic $C_1$ to $C_7$ acid with a multihydric $C_2$ to $C_7$ alcohol as means for improving the complete and embrittlement-free curing even at low temperatures and/or low ambient humidities, as well as the use of these esters, which are free of reactive hydrogen atoms, for improving the embrittlement-free curing of such one-component polyurethane foam compositions under unfavorable conditions (low temperature and little available ambient humidity).

12 Claims, No Drawings

ONE-COMPONENT POLYURETHANE COMPOSITIONS WITH IMPROVED CURING

FIELD OF INVENTION

The present invention relates to a one-component polyurethane foam composition, which contains at least one prepolymer (isocyanate prepolymer), which has isocyanate groups, at least one blowing agent and known auxiliary and additive materials, with improved embrittlement-free curing even at low temperatures and/or a slight ambient moisture content under the conditions given, and to the use of certain esters, free of reactive hydrogen atoms, as materials for improving the embrittlement-free curing of these one-component polyurethane foam compositions under the conditions given.

BACKGROUND INFORMATION AND PRIOR ART

The EP-A-O 480 342 discloses a one-component mixture for producing polyurethane foam for use from a pressure vessel. It contains an isocyanate group-containing prepolymer from a polyol and a polyisocyanate with a particular dynamic viscosity, conventional components and auxiliary materials, as well as 0.5 to 35.0% by weight of helium, neon, argon, nitrogen, oxygen, carbon dioxide, nitrous oxide or air as pre-foaming and blowing gas. Furthermore, it is stated that it may be advantageous to work with slight additions of low boiling solvents, such as esters, low-boiling esters, such as methyl acetate or ethyl acetate, ketones and fluorinated hydrocarbons, which reduce the viscosity.

The object of EP-A-O 200 801 is a one-component coating composition for producing protective coatings which, aside from an isocyanate prepolymer, contains plasticizer anti-settling agents, lamella-like extenders, color-producing pigments, moisture-binding agents and aliphatic esters. The aliphatic esters serve to extend the binder (pure solubilizer), to ensure the required processing viscosity and to attack the substrate, which is partially sensitive to the solvent, adequately yet not excessively. However, this state-of-the-art does not disclose one-component coating compositions, which contain a blowing agent and produce a polyurethane foam.

One-component polyurethane foams are used predominantly in the building sector, for example, for filling, insulating or fastening doors, windows and the like. Usually, for manufacturing these products, an isocyanate group-containing prepolymer (isocyanate prepolymer) is filled into a pressure vessel together with one or more blowing agents and conventional additives. The foaming prepolymer, brought out of the pressure vessel by the user, is cured under the action of the ambient moisture. At the same time, the reaction of the isocyanate groups, present in the prepolymer, with the water of the ambient moisture is used for the polymerization of the prepolymer.

Because the reaction partner, water, depends on the ambient conditions (temperature, humidity, air movement and like), such one-component polyurethane foam compositions react very sensitively to the absence of an adequate amount of the reactant, water. This problem arises particularly if the one-component polyurethane foam compositions in question are to be used at low temperatures. At low temperatures, the reaction rates naturally are slower and the moisture, available from the surroundings is less. Accordingly, it is usually recommended that the substrate, which is to be treated with the polyurethane foam composition, be moistened to begin with. However, this represents an additional step in the procedure for the user and affects the productivity. Moreover, at temperatures at or below freezing point, it is no longer possible to moisten the substrate because the temperature has dropped below the freezing point.

The visible indication of this effect of an insufficient availability of water is a slower, non-uniform or incomplete curing of the foam as well as a more or less pronounced embrittlement during the curing of the polyurethane foam. As a consequence, the incomplete curing of the foam can lead to a later expansion at higher temperatures and, associated therewith, to damage to the component.

The task of the present invention accordingly is to solve the problem of curing such one-component polyurethane foam compositions when less water is available, whether it be because of a lower humidity and/or because of low temperatures, so that an embrittlement-free, complete curing can be ensured even at low temperatures.

This task can be accomplished by adding to the one-component polyurethane foam composition certain esters, namely esters free of reactive hydrogen atoms, that is, free of hydroxy, mercapto, amino, imino and/or carboxyl groups, of a polycarboxylic $C_2$ to $C_7$ acid with a monohydric $C_1$ to $C_7$ alcohol and/or conversely a monocarboxylic $C_1$ to $C_7$ acid with a multihydric $C_2$ to $C_7$ alcohol.

Surprisingly, it has turned out that these esters, contained in the one-component polyurethane foam composition, react very easily with water or ambient moisture even at low temperatures and, in so doing, decompose into several molecules with reactive groups, that is, groups, which react with the isocyanate groups of the isocyanate, such as hydroxy groups, carboxyhydrol groups or NH groups. Because of the reaction of the ester with water and the use of polycarboxylic acids or multihydric alcohols, more reactive groups are available after the reaction than before. These reactive groups can then react directly with the isocyanate groups of the isocyanate prepolymer. It has turned out that the esters, which are preferably used pursuant to the invention, react so strongly with water, that the reaction between water and isocyanate, which otherwise is customary, is avoided during the curing of the one-component polyurethane foam composition and a direct reaction with the reactive reaction products of the esters used is achieved.

OBJECT OF THE INVENTION

The one-component polyurethane foam compositions of claim 1 are therefore the object of the present invention. The dependent claims relate to preferred embodiments of this inventive object, as well as to the use of the esters in question as means for improving the one-component polyurethane foam compositions containing the embrittlement-free curing.

SUMMARY OF THE INVENTION

The invention accordingly relates to a one-component polyurethane foam composition containing at least one isocyanate group-containing prepolymer (isocyanate prepolymer), at least one blowing agent and known auxiliary and additive materials, wherein at least one ester is contained, which is free of reactive hydrogen atoms and composed of a polycarboxylic $C_2$ to $C_7$ acid and a monohydric $C_1$ to $C_7$ alcohol and/or a monocarboxylic $C_1$ to $C_7$ acid and a multihydric $C_2$ to $C_7$ alcohol as a material for improving the complete and embrittlement-free curing even at low temperatures and/or when little moisture is available from the surroundings (low ambient humidity).

The ester, which is used pursuant to the invention and is free of reactive hydrogen atoms, is an ester, which is free of groups that react with the free isocyanate groups of the isocyanate prepolymer, that is, free of hydroxy, carboxyl or also amino groups.

Pursuant to a preferred embodiment of the invention, the polyurethane foam composition contains one or more esters of a saturated or unsaturated aliphatic $C_2$ to $C_7$ dicarboxylic acid with at least one $C_1$ to $C_7$ monoalcohol and/or at least one ester of a saturated or unsaturated aliphatic monocarboxylic $C_1$ to $C_7$ acid with at least one $C_2$ to $C_7$ polyalcohol, preferably a $C_2$ to $C_7$ dialcohol.

Esters, which are particularly preferred pursuant to the invention, are the esters of oxalic, malonic, succinic, glutaric, pimelic, suberic, citric, malic, maleic, fumaric, citraconic and mesaconic acid with at least one monohydric alcohol, such as methanol, ethanol, propanol, isopropanol, n-butanol, sec-butanol, t-butanol, pentaerythritol, pentanol, hexanol or heptanol or an ester of formic, acetic, propionic, butyric, isobutyric, valeric, isovaleric, pivalic, hexanoic or heptanoic acid with at least one multihydric alcohol, such as ethylene glycol, propylene glycol, butylene glycol, pentylene glycol, glycerol or pentaerythritol.

Especially preferred esters are dimethyl oxalate, diethyl oxalate, dipropyl oxalate, dibutyl oxalate, dimethyl malonate, diethyl malonate, dipropyl malonate, dibutyl malonate, dimethyl maleate, diethyl maleate, dipropyl maleate, dibutyl maleate, glycerol triformate, glycerol triacetate, glycerol tripropionate, dimethyl succinate, diethyl succinate, dipropyl succinate, dibutyl succinate, trimethyl acetyl citrate, triethyl acetyl citrate, tripropyl acetyl citrate and tributyl acetyl citrate.

The inventive one-component polyurethane foam compositions may contain one of the esters under discussion or also mixtures of two or more such esters.

The ester is present preferably in an amount of 0.5 to 10% by weight, especially of 1 to 6% by weight and particularly in an amount of 1.3 to 3% by weight, based on the weight of the isocyanate prepolymer.

The isocyanate group-containing prepolymer (isocyanate prepolymer), contained in the inventive one-component polyurethane foam composition, is known to those skilled in the art. Such prepolymers are commercially obtainable and are usually synthesized by the reaction of one or more polyols, such as a hydroxyl group-containing polyester or polyether with one or more polyisocyanates. The reaction usually is terminated while there are still free isocyanate groups in the product; in other words, a prepolymer is produced. Preferably, the isocyanate prepolymer contains 2 to 25% by weight, especially 8 to 18% by weight and particularly 10 to 12% by weight of isocyanate groups, based on the weight of the prepolymer.

An isocyanate prepolymer is understood to be an oligomer with reactive NCO groups, which is formed as a pre-adduct of at least one polyisocyanate and at least one polyol of the type defined above. As polyols, all hydroxyl group-containing polyesters and polyethers (long-chain polyols), customarily used for the production of prepolymers and having an OH functionality of more than 1 to 4 and especially of 2 to 3, as well as short-chain diols, can be used.

As polyester polyols, esters of dicarboxylic acids, preferably aliphatic dicarboxylic acids with 4 to 8 carbon atoms in the alkylene group, which are reacted with diols, find use. These esters must also contain free OH groups for the reaction. Examples of aliphatic dicarboxylic acids are pimelic, glutaric, azelaic and sebacic acid, as well as preferably succinic and adipic acid and aromatic dicarboxylic acids such as phthalic and terephthalic acids. As dihydric alcohols, ethylene glycol, diethylene glycol, 1,2- and 1,3-propylene glycol, dipropylene glycol, 1,4-butylene glycol and 1,6-hexylene glycol can be used.

However, polyester polyols of oleochemical origin may also be used. They do not have free epoxide groups and were synthesized by complete ring opening of epoxidized triglycerides of a fatty acid mixture, which contains at least partially olefinically unsaturated fatty acids, with one or more alcohols with 1 to 12 carbon atoms and subsequent partial transesterification of the triglyceride derivatives to alkyl ester polyols with 1 to 12 carbon atoms in the alkyl group (see DE 36 26 223).

As polyether polyols, products may be used, which are synthesized by known methods from one or more alkylene oxides with 2 to 4 carbon atoms in the alkylene group and a starter molecule, which contains two active hydrogens. Suitable alkylene oxides are, for example, tetrahydrofuran, 1,3-propylene oxide, 1,3- to 3,3-butylene oxide and ethylene oxide. As starter molecules, water, dicarboxylic acids, multihydric alcohols, such as ethylene glycol, propylene glycol, 1,2-diethylene glycol, dipropylene glycol and dimer diols come into consideration.

The long-chain diols from the above-mentioned building blocks have a molecular weight of more than 1,000, particularly 2,000 to 6,000 (gel chromatography). They are used in an amount of 0 to 20 and preferably 0.2 to 5 OH equivalents per NCO group.

The short-chain diols are used in an amount of 0 to 10 and especially of 1 to 3 OH equivalents per NCO group. They have a molecular weight of less than 1,000 and, in particular, of less than 100. Concrete examples are the diols, which were used for the synthesis of the long-chain diols.

The isocyanate prepolymer can also be synthesized from the polyisocyanate and compounds, which carry groups, which react with NCO and are different from the OH group, such as COOH—, SH—, $NH_2$— or NH— groups. Preferably, the NCO functionality is 1 to 4, especially 1.5 to 2.5 and particularly 2.

The isocyanate prepolymers are synthesized from the polyisocyanates and diols by known methods. As catalysts, those materials are used, which accelerate the reaction of the isocyanate group with the OH group, especially with water, but do not accelerate its trimerization. Concrete examples are dimorpholino diethyl ether, bisdimethylamino ethyl ether, Dabco X-DM (Air Products) as well as N-ethylmorpholine. Under certain circumstances, however, other catalysts can also come into consideration if they do not trimerize the isocyanate groups during storage, for example, N-substituted morpholine as well as its mixtures with propylene oxide adducts of triethanolamine, as well as the known metal catalysts, especially those of tin.

As polyisocyanate for the synthesis of the isocyanate prepolymer, the conventional, commercial diisocyanates and triisocyanates can be used, for example, the polyisocyanates sold under the trade names of Desmodur®, Lupranat®, or Suprasec®, toluylene diisocyanate (2,4- and/or 2,6-toluylene diisocyanate), isophorone diisocyanate, di- and polyphenylpolymethylene polyisocyanate, hexamethylene-1,6-diisocyanate or diphenylmethane-4,4-diisocyanate and mixtures thereof.

Independently of the nature of their synthesis, the reactive isocyanate prepolymers are characterized especially by the following distinguishing features: they have an NCO functionality of 2 to 6, preferably of 2.7 to 5 and particularly of 2.8 to 4 and an NCO content of 2 to 25% by weight, preferably of 8 to 18% by weight and particularly 10 to 12% by weight, based on the weight of the isocyanate prepolymer, as well as a viscosity of 5 to 200 and especially of 10 to 100 Paxsec, measured at 25° C. according to DIN 53 015.

Preferably, the isocyanate prepolymer has a molecular weight of 500 to 30,000 and especially of 1,000 to 25,000.

The composition necessarily consists of at least one polyisocyanate prepolymer, at least one blowing agent, optionally known auxiliary and additive materials, such as one or more catalysts for the reaction of the isocyanate group with the OH group, in particular with water, and at least one of the defined esters, which are free of reactive hydrogen atoms. Moreover, further additives may be added, such as solvents, flame retardants, plasticizers, cell regulators and aging prevention agents. A solution or an emulsion is formed.

As catalysts, preferably dimorpholinodiethyl ether or bis (dimethylaminoethyl) ether is used. It should catalyze only the reaction of the NCO groups with the OH groups and not the trimerization of the NCO groups during storage.

As foam stabilizer, preferably siloxane-oxyalkylene copolymers are used, such as Tegostab B 8404 (Goldschmidt) or Dabco DC-190, DC-193.

As flame retardants, preferably tris(2-chloropropyl) phosphate, tris(chloroethyl) phosphate, diphenylcresyl phosphate, DMMP and DEEP are used.

Suitable as blowing agents for the inventive one-component polyurethane foam compositions are, aside from air, nitrogen, carbon dioxide, nitrous oxide, gases that are preferably present in liquid form at room temperature, and liquids, which are inert with respect to the other components of the polyurethane foam composition and have a boiling point below 50° C. and especially between −50° C. and 30° C., as well as mixtures of gaseous and liquid blowing agents. Examples of such gases and liquids, which can be used preferably, are alkanes, such as propane, n-butane and isobutane, n-pentane and isopentane and preferably industrial mixtures of n-pentane, isopentane and cyclopentane, alkyl ethers, such as dimethyl ether, diethyl ether and methyl isobutyl ether, alkyl esters of carboxylic acids, such as methyl formate and halogenated, preferably fluorinated hydrocarbons, such as dichlorofluoromethane, trifluoromethane, 1,1-dichloro-1-fluoroethane, monochlorotrifluoroethane, monochlorodifluoroethane, difluoroethane, dichlorotrifluoroethane, monochlorotetrafluoroethane, pentafluoroethane, tetrafluoroethane, dichloromonofluoroethane, 1,1,1,2-tetrafluoroethane and/or 1,1,1,2,3,3,3-heptafluoropropane.

Furthermore usable as blowing agents are optionally substituted monocarboxylic acids with 1 to 30 carbon atoms and preferably aliphatic monocarboxylic acids with 1 to 10 carbon atoms. Such blowing agents are, for example, optionally substituted monocarboxylic acids, such as formic, 2-chloropropionic, 3-chloropropionic, 2,2-dichloropropionic, hexanoic, cyclohexanoic, dodecanoic, palmitic, stearic, oleic, glycolic and ricinoleic acid as well as tall oil fatty acids and preferably propionic acid, 2-ethylhexanoic acid and, particularly, acetic acid. The organic carboxylic acids, which react with the isocyanates to form ureas, acyl ureas and carbon dioxide, are used appropriately in combination with alkali metal or ammonium salts of organic carboxylic acids or tris(dialkylaminoalkyl)-s-hexahydrotriazines as catalysts. Due to the formation of carbon dioxide, the pressure cushion of blowing agent in the pressure vessel can be increased advantageously and the mechanical properties of the polyurethane foams can be modified due to the formation of the urea groups.

The blowing agents, named by way of example, can be used individually or as mixtures.

In the mixture with gases and/or liquids with boiling points below 50° C., cycloalkanes, such as hexane and cyclohexane and alkyl esters of carboxylic acids, such as ethyl formate with boiling points above 50° C., can also be used, provided that the blowing agent mixture advisably has a boiling point below 50° C. and has a blowing effect, which is adequate for forcing the one-component polyurethane foam composition, which is under pressure, out of the pressure vessel and foaming it into a polyurethane foam. As blowing agent, preferably mixtures of alkanes, especially of butane and/or of propane, and a liquid with a boiling point below 50° C., are used. The amount of blowing agent or blowing agent mixture required can easily be determined experimentally as a function of the nature of the blowing agent or of the blowing agent mixture as well as of the mixing relationships.

The amount of blowing agent in the inventive one-component polyurethane foam composition is 2 to 50% by weight and preferably 10 to 30% by weight.

As known auxiliary and additive materials, the inventive one-component polyurethane foam composition may contain surface-active materials, flame retardants, stabilizers, plasticizers, catalysts, solvents, fillers, dyes, pigments, hydrolysis-protecting agents and substances with fungistatic and bacteriostatic properties. Suitable flame retardants are, for example, diphenyl cresyl phosphate, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)-ethylene diphosphate.

Aside from the halogen-substituted phosphates named, inorganic flame retardants, such as aluminum oxide hydrate, antimony oxide, arsenic oxide, ammonium polyphosphate, expanded graphite and calcium sulfate or cyanuric acid derivatives, such as melamine, or mixtures of at least two flame retardants, such as ammonium polyphosphate and melamine and/or expanded graphite, as well as optionally starch, can be used to make the foams, produced from the one-component polyurethane foam composition, flame retardant. In general, it has proven to be advantageous to use 5 to 50 parts by weight and preferably 10 to 40 parts by weight of the flame retardants or flame retardant mixtures mentioned per 100 parts by weight of the polyhydroxy compounds.

As plasticizers, materials, which are known to have a plasticizing effect, such as butylbenzyl phthalate or dioctyl phthalate can be used. In this connection, it has proven to be advantageous to use the aforementioned hydroxyl group-containing polyesters or phosphorus-containing and/or halogen-containing compounds, such as the aforementioned flame retardants, since these additionally increase the flame retardance of the foams produced.

Fillers, particularly reinforcing fillers, are understood to be known conventional, organic and inorganic fillers and reinforcing agents. In particular, inorganic fillers, such as silicate minerals, for example, stratified silicates, such as antigorite, serpentine, horblendes, amphibole, chrysolite, zeolite, talcum, metal oxides, such as kaolin, aluminum oxide, aluminum silicate, titanium oxides and iron oxides, metal salts, such as chalk, pearl white and inorganic pigments, such as cadmium sulfide, zinc sulfide as well as glass particles, are named by way of example. As organic fillers, carbon black, colophony, cyclopentadienyl resins and grafted polymers come into consideration The inorganic and organic fillers can be used individually or also as mixtures and are incorporated in the one-component polyurethane foam composition advantageously in amounts of 0.5 to 50% by weight and preferably of 1 to 10% by weight, based on the weight of the one-component polyurethane foam composition.

Further details concerning the above-mentioned other conventional additives are given in the specialized literature, for example, in the monograph of J. H. Saunders and K. C. Frisch "High Polymers" volume XVI, Polyurethanes, parts 1 and 2, Interscience Publishers 1962 and 1964, or the Kunststoff-Handbuch (Plastics Handbook), Polyurethanes, volume VII, Carl-Hanser-Verlag, Munich, Vienna, $1^{st}$ and $2^{nd}$ editions, 1966 and 1983.

Quantitatively, the inventive one-component polyurethane foam compositions are constituted as follows (in % w/w):

50 to 90% and preferably 60 to 85% of the isocyanate prepolymers 0.1 to 5.0% and preferably 0.5 to 20% of catalysts 5 to 35% and preferably 10 to 25% of blowing agents and 0.1 to 5.0% and preferably 0.5 to 3.0% of foam stabilizer 0 to 20% and preferably 3 to 15% of plasticizer and 0.5 to 10% and preferably 1 to 6% of the ester, which is free of reactive hydrogen atoms.

Of the optional additives, the flame retardant can be added in an amount of 2 to 50% by weight and preferably of 5 to 15% by weight.

The remaining optional additives can be added in an amount of 0.1 to 3.0% by weight and especially of 0.2 to 1.5% by weight.

A further object of the present invention is the use of esters, which are free of reactive hydrogen atoms and synthesized from a polycarboxylic $C_2$ to $C_7$ acid and a monohydric $C_1$ to $C_7$ alcohol and/or from a monocarboxylic $C_1$ to $C_7$ acid and a multihydric $C_2$ to $C_7$ alcohol as means for improving the complete and embrittlement-free curing of blowing agent-containing one-component polyurethane foam compositions based on a prepolymer having isocyanate groups (isocyanate prepolymer) even at low temperatures and/or a low ambient humidity.

As already stated above, the esters of the type defined above, selected pursuant to the invention, react with the ambient water present significantly more vigorously than do the isocyanate groups of the isocyanate prepolymer, in that they are decomposed by a hydrolysis reaction into the carboxylic acid and the alcohol, the carboxyl groups of the carboxylic acid, as well as the hydroxyl group of the alcohol, reacting with the isocyanate groups of the isocyanate prepolymer and leading to the desired curing. In this connection, it has been observed that the esters, which are used pursuant to the invention, are hygroscopic and, with that, attract the ambient water and make it more useful for the aimed-for curing reaction. At the same time, the number of reactive groups, available for the curing, is multiplied, so that the water content of the air, which is naturally low particularly at low temperatures and, with that, the small number of hydroxy groups available are increased and, with that, curing is favored, which therewith proceeds rapidly and completely.

Due to the shift in the direct reaction of the ambient water with the isocyanate groups of the isocyanate prepolymer, achieved pursuant to the invention, to a reaction of the carboxyl groups or hydroxyl groups formed with the isocyanate groups, the temporary embrittlement phase, which otherwise occurs in the cold, is avoided during the curing. In this way, especially if the dialkyl oxalates, which are particularly preferred pursuant to the invention, such as dimethyl oxalate or diethyl oxalate, are added in very small amounts ranging from 1 to 2%, based on the isocyanate prepolymer, an enormous improvement in the curing behavior is achieved, especially at low temperatures up to –10° C. When these small amounts of ester are used, it is readily possible to achieve rapid and complete curing of the isocyanate prepolymers even at these low temperatures.

Pursuant to the invention, existing or also conventional prepolymer formulations can be equipped merely by the addition of the ester, used pursuant to the invention, in such a manner that an essentially problem-free curing of the one-component polyurethane foams becomes possible, so that prior moistening of the substrate can be omitted as a rule, the foams, modified in this way, curing without problems and free of embrittlement even at low temperatures.

The following example serves to explain the invention further.

EXAMPLE

An inventive one-component polyurethane foam composition is formed from the following constituents:

91.7 g of a polyethylene glycol diadipate with a hydroxyl number of 56

33.4 g of a polyoxypropylene polyol, started with glycerin and having a hydroxyl number of 400

30.6 g of a polyoxypropylene polyol, started with glycerin and having a hydroxyl number of 42

19.5 g of a polyethylene glycol with a molecular weight of 600

8.3 g of a polyoxyalkylene glycol polysiloxane copolymer as foam stabilizer 2.8 g of di-(2-morpholinocthyl) ether 91.7 g of trichloropropyl phosphate 403.1 g of diphenylmethane diisocyanate (crude MDI)

73.7 g of tetrafluoroethane 40.3 g of dimethyl ether 20.9 g of butane 4.2 g of propane The above constituents are mixed, the prepolymer being formed by chemical reaction. This prepolymer is transferred to a pressure vessel, from which the one-component polyurethane foam composition is delivered under the action of the pressure of the blowing agent.

The prepolymer reaction can also take place directly in the pressure vessel, that is, the formulation components or the pre-mixtures of the same are added to the vessel, where they react and remain.

To check the curing behavior, the above one-component polyurethane foam composition or a corresponding foam composition, without the addition of an inventive ester or with addition of diethyl oxalate, dimethyl malonate, diethyl maleate, glycerin triacetate, dibutyl oxalate, tributyl acetyl citrate and diethyl succinate, was prepared and cured for a period of 24 hours at –10° C. in an ambient atmosphere with a relative humidity of 75%.

Subsequently, the brittleness is given as the mass (in g) of a metal cylinder with a diameter of 19 mm, which is dropped at –10° C. from a height of 27 cm onto a foam billet 3 cm in diameter and destroys the surface. Higher values indicate a better elasticity. Metal cylinders with the following weights were tested: 20 g, 40 g, 60 g, 80 g, 100 g, 150 g, 200 g, 250 g, 300 g, 400 g.

The results obtained are summarized in the following Table:

| Ester | Formula | Molecular Weight | Boiling Point (° C.) | Amount used (% w/w) based on the isocyanate prepolymer | Brittleness (g) |
|---|---|---|---|---|---|
| Without addition (comparison) | | | | — | 60 |
| Diethyl oxalate | $C_6H_{10}O_4$ | 146.14 | 185 | 2 | 200 |
| Diethyl malonate | $C_7H_{10}O_4$ | 160.17 | 199 | 2.4 | 200 |
| Diethyl maleate | $C_8H_{12}O_4$ | 172.18 | 222 | 2.5 | 200 |
| Glycerin triacetate | $C_9H_{14}O_6$ | 218.21 | 258 | 3.0 | 200 |
| Dibutyl oxalate | $C_{10}H_{16}O_4$ | 202.25 | $Bp_{10} = 123°$ C. | 3.2 | 250 |
| Tributyl acetyl citrate | $C_{20}H_{34}O_8$ | 402.49 | 1 hPa 170° C. | 5.7 | 200 |
| Diethyl succinate | $C_8H_{14}O_4$ | 174.2 | 216 | 1.9 | 150 |

The above Table shows that, by the addition of the ester used pursuant to the invention, a clear improvement is obtained with respect to an embrittlement-free curing even at low temperatures.

What is claimed is:

1. A one-component polyurethane foam composition, comprising at least one isocyanate group containing prepolymer, at least one blowing agent and known auxiliary and additive materials, said composition further comprising at least one ester, which is free of reactive hydrogens and formed from a saturated or unsaturated aliphatic $C_2$ to $C_7$ dicarboxylic acid with at least one $C_2$ to $C_7$ monoalcohol and/or at least one ester of a saturated or unsaturated aliphatic $C_2$ to $C_7$ monocarboxylic acid with at least one $C_2$ to $C_7$ polyalcohol improving the complete and embrittlement-free curing of the composition even at low temperatures and/or low ambient humidities.

2. The one-component polyurethane foam composition of claim 1, wherein the ester is free of hydroxy and/or carboxyl groups.

3. The one-component polyurethane foam composition of claim 1, wherein the ester is an ester of oxalic, malonic, succinic, glutaric, pimelic, suberic, citric, malic, maleic, fumaric, citraconic or mesaconic acid with at least one monohydric alcohol, such as methanol, ethanol, propanol, isopropanol, n-butanol, sec-butanol, t-butanol, pentaerythritol, pentanol, hexanol or heptanol or an ester of formic, acetic, propionic, butyric, isobutyric, valeric, isovaleric, pivalic, hexanoic or heptanoic acid with at least one multihydric alcohol, such as ethylene glycol, propylene glycol, butylene glycol, pentylene glycol, glycerol or pentaerythritol.

4. The one-component polyurethane foam composition of claim 1, wherein the composition contains at least one ester of the group consisting of dimethyl oxalate, diethyl oxalate, dipropyl oxalate, dibutyl oxalate, dimethyl malonate, diethyl malonate, dipropyl malonate, dibutyl malonate, dimethyl maleate, diethyl maleate, dipropyl maleate, dibutyl maleate, glycerol triformate, glycerol triacetate, glycerol tripropionate, dimethyl succinate, diethyl succinate, dipropyl succinate, dibutyl succinate, trimethyl acetyl citrate, triethyl acetyl citrate, tripropyl acetyl citrate and tributyl acetyl citrate.

5. The one-component polyurethane foam composition of claim 1, wherein the composition contains the ester in an amount of 0.5 to 10% by weight, preferably of 1 to 6% by weight and particularly of 1.5 to 3% by weight, based on the weight of the isocyanate prepolymer.

6. The one-component polyurethane foam composition of claim 1, wherein the composition contains, as isocyanate prepolymer, a prepolymer from one or more polyols and one or more polyisocyanates with an NCO functionality of 2 to 6, preferably of 2.7 to 5 and particularly of 2.8 to 4 and a molecular weight of 500 to 30,000 and preferably of 1,000 to 25,000.

7. The one-component polyurethane foam composition of claim 6, wherein the isocyanate group content of the isocyanate prepolymer is 5 to 25% by weight, preferably 8 to 18% by weight and particularly 10 to 12% by weight, based on the weight of the isocyanate prepolymer.

8. The one-component polyurethane foam composition of claim 1, wherein the composition, as blowing agent, contains air, nitrogen, carbon dioxide, nitrous oxide, fluorinated and/or chlorinated hydrocarbons, especially dimethyl ether, butane or propane.

9. The one-component polyurethane foam composition of claims wherein the blowing agent is present in an amount of 2 to 50% by weight and preferably of 10 to 30% by weight, based on the one-component polyurethane foam composition.

10. The one-component polyurethane foam composition of claim 1, wherein the known auxiliary and additive materials are surface-active materials, flame retardants, stabilizers, plasticizers, catalysts, solvents, fillers, dyes, pigments, hydrolysis-protecting agents and substances with fungistatic and bacteriostatic properties.

11. A method of improving the complete and embrittlement-free curing of a blowing agent-containing one-component polyurethane foam composition based on a prepolymer having isocyanate groups (isocyanate prepolymer) even at low temperatures and/or low ambient moisture which comprises admixing the prepolymer with an ester which is free of reactive hydrogen atoms and synthesized from a polycarboxylic $C_2$ to $C_7$ acid and a monohydric $C_1$ to $C_7$ alcohol and/or from a monocarboxylic $C_1$ to $C_7$ acid and a multihydric $C_2$ to $C_7$ alcohol.

12. The method of claim 11 wherein 0.5–10% by weight of ester, calculated on the weight of the prepolymer, are admixed with the prepolymer.

* * * * *